Patented Aug. 20, 1940

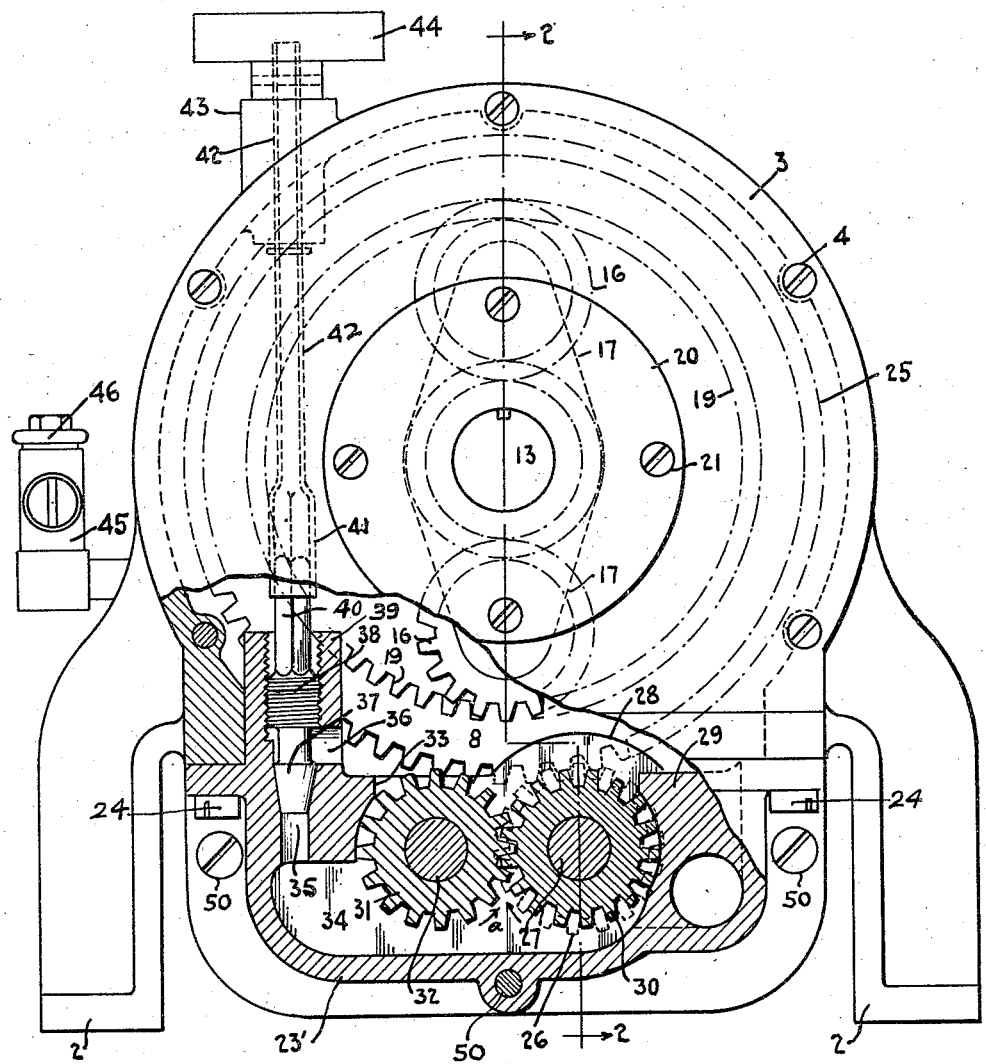

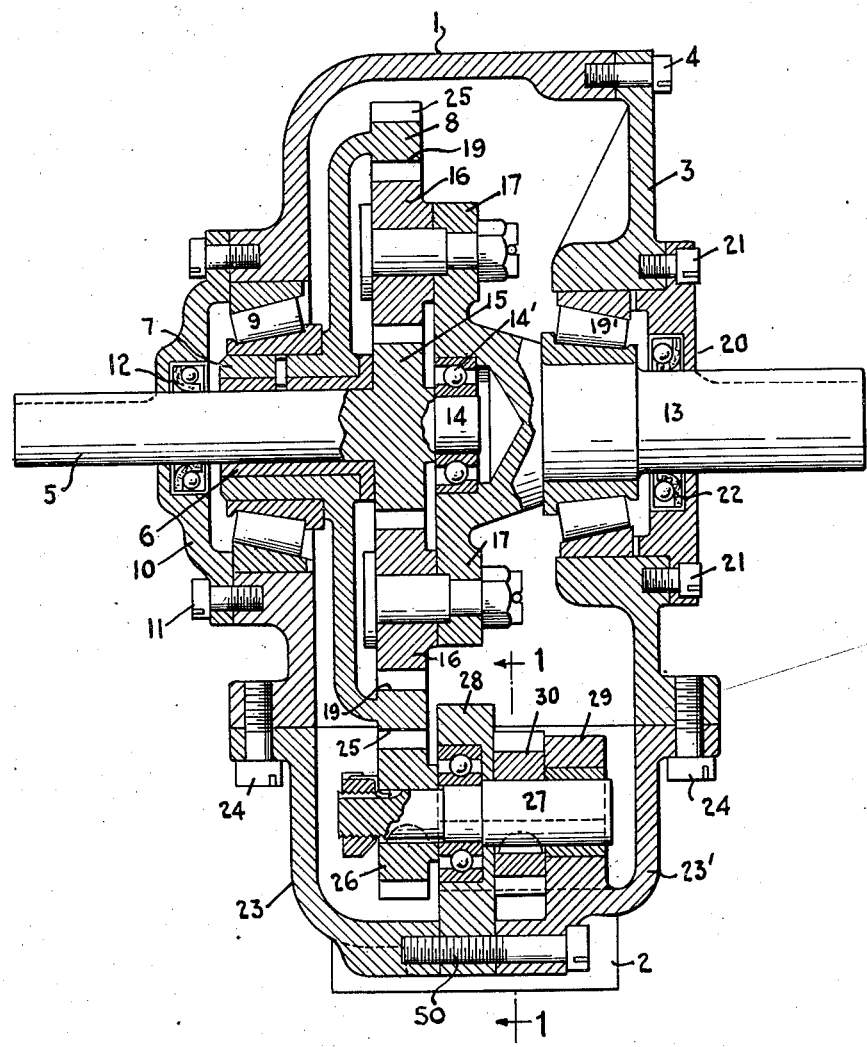

2,212,046

UNITED STATES PATENT OFFICE 2,212,046

VARIABLE SPEED TRANSMISSION

Edward T. Ross, Newark, N. J.

Application April 26, 1938, Serial No. 204,257

4 Claims. (Cl. 74—293)

This invention relates to means for varying the ratio of speeds of driving and driven shafts in a power transmission involving planetary gearing.

The main object of the invention is to provide apparatus of the character indicated which shall be simple in construction and efficient in operation.

A further object of the invention is to provide improved means for variably retarding, whereby to vary the speed ratio of a transmission, the ring gear of a planetary gearing.

A further object of the invention is to provide improved means for variably retarding the ring gear of a planetary gearing in a transmission, such means utilizing the lubricating oil of the transmission.

A further object of the invention is to provide a variable speed transmission involving a planetary gearing having its ring gear retarded by a gear pump operating on the lubricating oil in the casing of the transmission and varying the retardation of the ring gear by controlling the fluid pumped.

Other and ancillary objects of the invention will appear hereinafter.

In the accompanying drawings which illustrate the invention—

Fig. 1 is an end elevation, (viewed from the right of Fig. 2) of a transmission embodying the invention, partly broken away to show a section on the line 1—1 of Fig. 2; and Fig. 2 is a section on the line 2—2 of Fig. 1.

Referring to the drawings, the apparatus comprises a casing including a main portion 1 having the legs 2 for supporting the device, and a head 3 secured to the main portion by screws 4.

The rotatable drive shaft 5 is rotatable in a sleeve 6 which is secured to the hub 7 of the ring gear 8 of planetary gearing as hereinafter referred to, this hub (and the ring gear) being rotatably mounted in the casing by means of a roller bearing 9. A cap 10 secured to the casing by screws 11 surrounds the shaft and closes the casing about the shaft, a suitable packing 12 preventing leakage between the shaft and cap.

Fixed to the shaft 5 is a spur gear 15 and the shaft 5 and driven shaft 13 are held in alignment by having the end 14 of the shaft 5 journaled in a recess in the end of the shaft 13 by means of a ball bearing 14'.

The gear 15 meshes with spur gears 16 rotatably mounted on arms 17 fixed to the end of the shaft 13 and the gears 16 in turn mesh with teeth 19 extending entirely about the interior of the ring 8 and, as is well known in connection with planetary gearing, the shaft 13 will be driven at a speed with relation to that of the shaft 5 which is dependent upon the retardation of the ring 8, being driven at the highest speed when the ring is held stationary and at the lowest speed when the ring is free to turn under the influence of the gears 16.

The shaft 13 is rotatably mounted in the casing head 3 by means of roller bearings 19' and the cap 20 which closes the casing and is secured thereto by screws 21, suitable packing 22 being provided between the shaft and casing to prevent leakage.

The casing bottom is formed by members 23 and 23' divided transversely of the axis of the driving and driven shafts. The members 23 and 23' are secured together with the plate 28 clamped between their edges, by means of the screws 50 extending into the members and plate, the whole forming a tight casing bottom for retaining the lubricating oil which is secured to the casing part 1 by means of screws 24. Lubricating oil is provided in the casing of such depth that it will be carried up to lubricate the gears and bearings referred to.

In order to provide means for variably retarding the ring 8 to vary the ratio of speed transmission between the driving and driven shafts, gear teeth 25 are provided on the ring 8 entirely about its outer circumference, which teeth mesh with a gear 26 keyed to the shaft 27 rotatably mounted in the plate 28 and a rib 29. Also keyed to the shaft 27 is a pump gear 30 which meshes with another pump gear 31 keyed on the shaft 32 rotatably mounted in the plate 28 and rib 29. The pump gears fit closely between the plate 28 and rib 29, and the rib, which is integrally formed with the casing part 23', extends about the pump gears into tight contact with the plate 28 whereby a casing for the pump gears is formed having an opening 33 in its top and a chamber 34 at the bottoms of the gears. The ends of the pump casing closely fit the pump gears as clearly shown in Fig. 1. Communication between the chamber 34 and the outside of the pump casing is afforded by means of a duct 35 in the pump casing leading to the opening 36. Passage through this duct is controlled by means of a valve 37 having its stem 38 in screw threaded engagement within the neck 39 on the pump casing, and having the portion 40 of square cross section which telescopes within the end of the tube 41 having a square cross section so that the two turn together but may relatively slide longitudinally. The remainder 42 of the tube is circular in cross section and is rotatably mounted in a boss 43 in the main gear casing but is held against longitudinal sliding therein. On the outside of the main gear casing, an operating wheel 44 is fixed to the tube and it will be apparent that by turning the wheel in one direction or the other the valve will be moved to more or less close the outlet from the pump casing.

Oil may be supplied to the interior of the main gear casing by means of the intake 45 closed by a screw plug 46.

In the operation of the apparatus, the driving and driven shafts will turn in a direction to cause the pump gears 30 and 31 to rotate in the direction as indicated by the arrow a in Fig. 1 and the lubricating oil will be filled into the transmission casing to a depth well above the intake opening 33 of the gear pump. The driving shaft will then drive the driven shaft through the planetary gearing comprising the gears 15 and 16 with the ring gear 8. The driving of the gear pump as described will cause the lubricating oil to be forced into the chamber 34 and thence outwardly through the passage 35 and opening 36 into the transmission casing outside the pump casing.

It will be apparent that the resistance encountered by the pump gears; and therefore the retardation exerted upon the ring gear 8, will depend upon the degree of opening of the valve 37 and that this may be caused to be of any extent desired by turning the operating wheel 44 upon the exterior of the transmission, in one direction or the other.

It will now be apparent that the speed ratio of the driving and driven shafts may be varied at will by turning the wheel 44 in one direction or the other.

While the invention has been illustrated in what is considered its best application it may have other embodiments without departing from its structure and is not therefore limited to the structures shown in the drawings.

What I claim is:

1. In a variable speed transmission, the combination with driving and driven shafts, of planetary gearing between said shafts, the orbit gear of said gearing having teeth upon its inner and outer circumference, planetary gears meshing with the inner teeth of said orbit gear and connected to one of said shafts, a sun gear meshing with said planetary gears and connected to the other of said shafts, a casing for said planetary gearing spaced from said planetary gearing, a gear pump comprising a plurality of intermeshing gears and a pump casing therefor, said gear pump being in the bottom of said casing, the shaft of one of the pump gears being extended and a driving gear fixed on said shaft and meshing with the external teeth upon said orbit gear, said gear pump being open to said planetary gear casing and adapted to pump the lubricating fluid for said planetary gear from the bath in the bottom of said planetary gear casing and a valve for controlling the flow of fluid from said pump.

2. In a variable speed transmission, the combination with driving and driven shafts, of planetary gearing between said shafts, the orbit gear of said gearing having teeth upon its inner and outer circumference, planetary gears meshing with the inner teeth of said orbit gear and connected to one of said shafts, a sun gear meshing with said planetary gears and connected to the other of said shafts, a casing for said planetary gearing spaced from said planetary gearing, a gear pump comprising a plurality of intermeshing gears, said gear pump being in the bottom of said casing, the shaft of one of the pump gears being extended and a driving gear fixed on said shaft and meshing with the external teeth upon said orbit gear, said gear pump being open to said planetary gear casing and adapted to pump the lubricating fluid for said planetary gear from the bath in the bottom of said planetary gear casing and a valve for controlling the flow of fluid from said pump, the said pump having a pump casing comprising separate plates on opposite sides of the said pump gears, the said pump gear shaft which carries the said driving gear meshing with the orbit gear teeth, passing through one of said plates, the last mentioned pump gear being within said casing and the driving gear on the shaft thereof being outside the pump casing.

3. In a variable speed transmission, the combination with driving and driven shafts, of planetary gearing between said shafts, the orbit gear of said gearing having teeth upon its inner and outer circumference, planetary gears meshing with the inner teeth of said orbit gear and connected to one of said shafts, a sun gear meshing with said planetary gears and connected to the other of said shafts, a casing for said planetary gearing, a gear pump comprising a plurality of intermeshing gears, said gear pump being in the bottom of said casing, one of the pump gears being geared to the external teeth upon said orbit gear, said gear pump being adapted to pump the lubricating fluid for said planetary gear and a valve for controlling the flow of fluid through said pump, the said gear pump having a casing comprising plates on opposite sides of the pump gears, said planetary gear casing having separable parts, one of said plates of the pump casing being secured to one of said separable parts and the other plate of said pump casing being adapted to disassembly on separation of said separable parts of the planetary gear casing.

4. In a variable speed transmission, the combination with driving and driven shafts, of planetary gearing between said shafts, the orbit gear of said gearing having teeth upon its inner and outer circumference, planetary gears meshing with the inner teeth of said orbit gear and connected to one of said shafts, a sun gear meshing with said planetary gears and connected to the other of said shafts, a casing for said planetary gearing, a gear pump comprising a plurality of intermeshing gears, said gear pump being in the bottom of said casing, one of the pump gears being geared to the external teeth upon said orbit gear, said gear pump being adapted to pump the lubricating fluid for said planetary gear and a valve for controlling the flow of fluid through said pump, the said gear pump having a casing comprising plates on opposite sides of the pump gears, said planetary gear casing having separable parts, one of said plates of the pump casing being secured to one of said separable parts and the other plate of said pump casing being adapted to disassembly on separation of said separable parts of the planetary gear casing, the last mentioned plate of the pump gear casing being clamped between the said separable portions of the planetary gear casing.

EDWARD T. ROSS.